United States Patent [19]

Rothfuss et al.

[11] Patent Number: 4,762,658

[45] Date of Patent: Aug. 9, 1988

[54] METHOD OF TABLETING OF DE-OILED PHOSPHATIDES (LECITHIN)

[75] Inventors: Diane Rothfuss, Fort Wayne; Roger A. Lantz, Auburn, both of Ind.

[73] Assignee: Central Soya Company, Inc., Fort Wayne, Ind.

[21] Appl. No.: 916,895

[22] Filed: Oct. 8, 1986

[51] Int. Cl.$^4$ .................... B29C 67/00; A23J 7/00
[52] U.S. Cl. ........................... 264/122; 264/123; 264/129; 424/465; 424/481; 426/285; 426/662; 514/78
[58] Field of Search ............... 264/122, 123, 118, 129, 264/112; 260/403; 514/78; 426/662, 285; 424/464, 465, 474, 475, 481

[56] References Cited

U.S. PATENT DOCUMENTS

| | | | |
|---|---|---|---|
| 1,988,050 | 1/1935 | Rosenbusch | 514/78 |
| 3,012,888 | 12/1961 | Davis et al. | 426/662 |
| 3,069,361 | 12/1962 | Cogswell | 426/662 |
| 3,920,857 | 11/1975 | Barker et al. | 426/662 X |
| 4,367,178 | 1/1983 | Heigel et al. | 260/403 |
| 4,374,082 | 2/1983 | Hochschild | 264/129 |

*Primary Examiner*—James Lowe
*Assistant Examiner*—Mary Lynn Fertig
*Attorney, Agent, or Firm*—Tilton, Fallon, Lungmus & Chestnut

[57] ABSTRACT

A method of tableting de-oiled phosphatides (lecithin) where the moisture content of granular lecithin is maintained below about 1% the aerated density above about 0.38 grams per cubic centimeter and the percent compressibility below about 15%.

5 Claims, No Drawings

METHOD OF TABLETING OF DE-OILED PHOSPHATIDES (LECITHIN)

BACKGROUND OF INVENTION

This invention relates to the tableting or compressing de-oiled phosphatides, more commonly known as granular lecithin, into a solid and cohesive form suitable for ingesting orally.

According to the Food Chemicals Codex, 3rd Edition, granular lecithin is referred to as a material where the preponderance of triglycerides and fatty acids are removed and the product contains 90% or more of phosphatides representing all or certain fractions of the total phosphatide complex. Major manufacturers of oil-free lecithin have agreed upon a 95% A.I., or acetone-insolubles minimum. To date, a high percentage granular lecithin tablet is yet to be commercially available.

Liquid and granular lecithins have long been recognized as a nutritional, dietary source of choline. This invention offers a viable alternative to the already available liquid-lecithin gelatin capsules, some of which contain up to 50% soybean oil. Commercially available granular lecithin tablets are known to contain high percentages of undesirable excipients and/or fillers, commonly used to aid in the tableting process or to create bulk for the active ingredient. In some instances, the lecithin is used as a base material for other active ingredients, i.e., vitamins and minerals—see, for example, U.S. Pat. No. 4,374,082. The highest content of granular lecithin found in a dry-pressed tablet has been 42%.

Problems normally associated with the tableting of granular lecithin include poor flowability and stickiness. At this time, we have not determined what actually defines stickiness, however, we can measure its presence using physical characteristics analyses. Consequently, these inherent material characteristics can produce low weight tablets, sticking, and breakage of the tablets upon ejection from tableting press. These problems were alleviated simply by adding a substantial amount of excipient to improve the flow and release of the tablet. But this did not provide the desired high level concentration of lecithin. Attempts to reduce the amount of excipient produced varied results. Surprisingly, the instant invention effectively eliminates any substantial amount of tableting excipient or fillers by more strictly controlling the physical and compositional characteristics of the granular lecithin.

SUMMARY OF INVENTION

This method involves the tableting of de-oiled soybean phosphatides suitable for oral ingestion. The soy phosphatides, or granular lecithin, possessing an appropriate moisture level and fulfilling the requirements set for aerated density and percent compressibility, are first dry blended with a preferred excipient, an example of which would be an edible hydrogenated lipid material at a level sufficient to ensure proper lubrication and release of the tablets. This dry-blended material is then put through a tableting press at compaction pressures sufficient to form a solid and cohesive mass. More particularly, we have discovered that the moisture level in the granular lecithin should be below about 1%, the aerated density above about 0.3 grams per c.c. and the percent compressibility less than about 15%. Additionally the storage, blending, and tableting of such products should be performed in a closely monitored environment, preferably one being low in relative humidity and temperature.

The solid, non-brittle dosage may then be coated with any suitable food grade material, so as to provide not only a shiny, finished surface, but to strengthen the tablet and to retard the hygroscopicity of the lecithin.

DESCRIPTION OF INVENTION

The characteristics most critical to the tableting process include: moisture content, flowability, and the stickiness of the de-oiled lecithin.

The moisture content in the granular lecithin and its relationship in the tableting process have recently been discovered in testing. Food Chemicals Codex specifications permit a moisture content of 1.5% in granular lecithin. This limit, which allows for microbial stability and ease of handling is unsuitable for tableting. Moisture levels above 1.0% can drop the efficiency of the tableting process by decreasing the flowability and raising the stickiness level. The preferred moisture range is 0.5–0.9%.

The flowability of the material, as determined by moisture content, stickiness and/or variability in particle size is important insofar as it determines how consistently and evenly the die cavities are filled as they rotate on the die table. Uneven or low fill weights will produce variable tablet weights as well as sticking and breakage of the tablets.

Aerated density and percent compressibility are two measurements in which stickiness of the granular lecithin can be determined. Aerated densities can range upwardly from about 0.38 g/c.c.

Percent compressibility for granular lecithin can be computed as follows: $100 \ (P-A)/P = \% \ C$, where $P$ = packed bulk density and $A$ = aerated bulk density. Aerated (loose) bulk density is the weight of a material per unit volume, and packed bulk density is where the material has been shaken to permit the particles to naturally settle into the same volume and measured. This was accomplished using a Powder Characteristics Tester, manufactured by Hosokawa Micromeritics Laboratory, Osaka, Japan. A 100 cc container was fitted with a vertical extension which held an overflow of material and the two containers were then vibrated, or tapped for five minutes. The material in the lower container packed down, leaving a void that was filled by the material above. The more compressible granular lecithin is, the less flowable or tabletable it will be. This fact contradicts the behavior of more typical powders used in the pharmaceutical industry, some of which have very high binding properties. Compressibility will also indicate uniformity in particle size and shapes, cohesion or stickiness, and moisture content. Compressibilities more than 15% were found to be unacceptable.

Because granular lecithin is a very hygroscopic material, environmental conditions play a vital role in keeping the moisture content below critical levels. High temperatures and relative humidity levels can elevate the moisture content to a point where the flowability is seriously reduced, even in short exposure periods, At 68° F., and 82% relative humidity, the moisture content in granular lecithin can rise from 0.55% to 2.20% in just one hour exposure time.

The mixture of granular lecithin and excipient can be compressed into any suitable form, where the method of compaction would sufficiently compress and densify the blend. An example would be the Vector Colton 250 tableting press manufactured by Vector Corporation of Marion, Iowa, or a Stokes DS3-15 manufactured by Stokes Pennwalt Company, Warminster, Pa.

The preferred excipient in this process is classed as a hydrogenated lipid material, namely hydrogenated vegetable oils, with a maximum Iodine Value of 5. Other classes found acceptable included talcs, silicas, and cellulose based excipients.

EXAMPLE 1

Described below are the processing steps used for the production of high-percentage granular lecithin tatlets.

De-oiled soybean phosphatides, or CENTROLEX®R, lot 105033, manufactured by Central Soya Company, Inc., of Fort Wayne, Ind., possessed an A.I. of 97.8%, a moisture content of 0.46%, an aerated density of 0.40, and a compressibility of 11.6%. The de-oiled granular lecithin was mixed with 2.0% (total weight) Lubritab TM, a hydrogenated vegetable oil, manufactured by Edward Mendell Company, Inc. of Carmel, N.Y. The two materials were dry-blended in a Liquid-Solids V-type blender, manufactured by Patterson-Kelly Company, East Stroudsburg, Pa. for a period of 15 minutes. This mixture was then placed into the feed hopper of a 12-station Vector Colton 250 rotary table press, manufactured by Vector Corporation, Marion, Iowa. The blend was gravity fed into the dies of the tableting punches, compressed at a pressure of 2000 lbs/in$^2$ where the preferred color, weight and hardness was achieved.

EXAMPLE 2

The method recited in example 1 was followed using de-oiled soybean phosphatides, or CENTROLEX®R, lot #104314. There, the phosphatides possessed an A.I. of 96.8%, a moisture content of 0.63%, an aerated density of 0.33 g/cc, and a compressibility of 22.3%. When blended with the same excipient, this material experienced serious flowability problems and produced an extreme amount of sticking, which forced the shutdown of the tableting press. Sticking, inadequate die fills and tablet breakage were all signs that the material was unsuitable for tableting.

EXAMPLE 3

The method recited in example 1 was again followed using de-oiled soybean phosphatides, or CENTROLEX®R, lot #104237, having an A.I. of 97.7%, a moisture content of 0.74%. Two additional samples of #104237 were left exposed to atmosphere, one having a moisture content of 1.35%, and the other having 2.32% moisture. The first or control material tableted quite well, at speeds of 50 rpm and pressures of 1500 lb/in . The 1.35% H$_2$O sample immediately showed signs of sticking and higher compaction pressures caused by the uneven die cavity fills, and dark, broken tablets. The 2.32% H$_2$O material was virtually untabletable. Sticking, pitting on the surface of the tablets and breakage was evidence of the high moisture and poor flowability observed with this material.

EXAMPLE 4

The method recited in example one was followed but included the additional step of coating the tablets to minimize breakage and to reduce the hygroscopicity of the tablets, using Opaglos ®, a food-grade shellac, produced by Colorcon Inc., West Point, Pa. Again, a superior tableted product resulted.

In some instances we were able to tablet 100% granular lecithin—this under very carefully controlled conditions of humidity so that the moisture content of the lecithin remained continually under 1.0%. This was achieved when the laboratory conditions were at ambient temperature and the relative humidity less than about 30which is the preferred condition. Such a procedure is preferred by pharmaceutical companies because they are set up for providing the care required in controlling all the critical parameters. Therefore, this excipient-free procedure is considered within the scope of our invention.

In practice, we find it advantageous to use at least about 80% de-oiled phostatides in the phosphatides-excipient mixture.

Many variations may be made in the details of the invention without departing from the spirit and scope thereof.

We claim:

1. A method of tableting granular lecithin comprising dry mixing de-oiled phosphatides and an excipient where said phosphatides are present in an amount of at least about 80%, said phosphataides having a moisture content less than about 1.0% an aerated density in the range of above about 0.38 gm/c.c., a compressibility of less than about 15% , and thereafter compressibly forming tablets of the mixture.

2. The method of claim 1 in which the tablets were subsequently coated with food-grade shellac.

3. The method of claim 1 in which said excipient is an edible hdrygenated lipid material.

4. The method of claim 3 in which the excipient constituted about 2% of the total weight of the mixture of said phosphatides and excipient.

5. A method of tableting granular lecithin comprising introducing dry de-oiled phosphatides into compressive tableting equipment where said phosphatides have a moisture content less than about 1.0%, an aerated density in the range of above about 0.38 gm/c.c., and a compressibility of less than about 15%, and maintaining the humidity conditions surrounding the tableting equipment at less than about 30% relative humidity.

* * * * *

UNITED STATES PATENT AND TRADEMARK OFFICE
CERTIFICATE OF CORRECTION

PATENT NO. : 4,762,658

DATED : August 9, 1988

INVENTOR(S) : Diane Rothfuss and Roger A. Lantz

It is certified that error appears in the above-identified patent and that said Letters Patent is hereby corrected as shown below:

Column 1, line 66, change "0.3" to -- 0.38 --.

Column 3, line 13, change "tatlets" to -- tablets --.

Column 4, line 19, change "30which" to -- 30% which --.

Signed and Sealed this

Twenty-seventh Day of December, 1988

Attest:

DONALD J. QUIGG

Attesting Officer

Commissioner of Patents and Trademarks